2,804,369

PRODUCTION OF URANIUM HEXAFLUORIDE

Robert Dudley Fowler, Baltimore, Md., assignor to the United States of America as represented by the United States Atomic Energy Commission No Drawing. Application February 24, 1947, Serial No. 730,557

8 Claims. (Cl. 23—14.5)

This invention relates to a process for the production of metal fluorides and more particularly to a process for the production of uranium hexafluoride from the oxides of uranium.

An object of the present invention is to provide simple and economical methods for the production of uranium hexafluoride ($UF_6$).

An additional object of the invention is the conversion of $UF_4$ to $UF_6$ by the action of a fluorinating agent such as cobaltic fluoride ($CoF_3$).

An additional object is the provision of a method for the production of $UF_6$ embodying the advantages of minimum handling operations, no filtrations and no dehydrations.

Other objects will in part be obvious to those skilled in the art and in part pointed out hereinafter.

One method for the production of $UF_6$ is by the action of elemental fluorine on $UF_4$. However, uranium tetrafluoride ($UF_4$) is not a commercially available material, and I have therefore aimed to provide a process which is applicable to the readily available sources of uranium such as uranium trioxide ($UO_3$) and uranium tritaoctoxide ($U_3O_8$). In accordance with the invention these higher oxides of uranium may be reduced to uranium dioxide ($UO_2$), the latter converted into uranium tetrafluoride by reaction with hydrogen fluoride, and the $UF_4$ converted to $UF_6$ by reaction with a fluorinating agent, such as $CoF_3$.

Uranium dioxide ($UO_2$) may be converted directly into $UF_4$ by treatment with dry hydrogen fluoride according to the reaction equation:

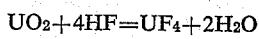

$$UO_2 + 4HF = UF_4 + 2H_2O$$

However, neither the treatment of $UO_2$ nor the treatment of the higher oxides of uranium, $UO_3$ and $U_3O_8$, with HF will yield $UF_6$. Moreover, such treatment of $UO_3$ and $U_3O_8$ instead of producing $UF_4$ tends to produce the oxyfluorides.

A process in accordance with the invention is as follows:

The uranium oxide, either $UO_3$ or $U_3O_8$ or a mixture of the two, is placed in a reaction chamber, for example in a copper boat or tray enclosed in a copper oven, and heated to 500–650° C., and hydrogen gas is passed through the oven in contact with the uranium oxide in the boat. For a batch of say 3 kilograms it is desirable to pass the hydrogen at a relatively slow rate, say about 100 cc. per minute for a time sufficient to complete the conversion, say 8 or 9 hours. The oven is then swept clean of hydrogen and water formed by the reaction by, e. g., a current of dry nitrogen gas, and while continuing to maintain the temperature between 400° C. and 600° C. anhydrous hydrogen fluoride is passed through at the rate of about 100 cc. per minute for 8 to 9 hours. It will be appreciated that the rate of supplying hydrogen and hydrogen fluoride will depend upon the amount of surface presented for reaction. It is desirable to spread the uranium oxide fairly thin, say about one-half inch deep in the copper boat so as to facilitate its reduction by the hydrogen, and the lower oxide remains in the same position for reaction with the hydrogen fluoride.

After completion of the conversion of $UO_2$ to $UF_4$ the reaction chamber is swept clear of HF and $H_2O$ formed by the reaction by means of a stream of nitrogen or other suitable inert gas, and the temperature of the reaction chamber is lowered to about 400° C. or less. Then the $UF_4$ is mixed with the requisite quantity of $CoF_3$ (2 gram mols of $CoF_3$ to one gram mol of $UF_4$), and after clearing the reaction vessel of air, preferably by evacuating it, the mixture is heated to 300–400° C. and the resulting $UF_6$ is led off and delivered to a condenser or trap cooled to a sufficiently low temperature to condense it, e. g., −70° C. Such a temperature may be produced by a mixture of solid carbon dioxide and methyl alcohol. The overall yield of $UF_6$ by this method, based upon the uranium content of the uranium oxide used is usually better than 95%.

The cobaltic fluoride ($CoF_3$) used for this process may be made by treating cobaltous fluoride ($CoF_2$) with elemental fluorine, e. g., by placing the $CoF_2$ in a copper boat in a copper reaction chamber, heating to about 200° C. and passing fluorine gas into the chamber. An advantage of this process is that the fluorine gas, produced for instance by the electrolysis of an acid fluoride or a mixture or a combination of an alkali metal fluoride and hydrogen fluoride, need not be purified with respect to HF before it is used. Another advantage of the above procedure is that after heating the mixture of $UF_4$ and $CoF_3$ and expelling the $UF_6$, the residue of $CoF_2$ may be treated with fluorine, as described above, to reconvert it into $CoF_3$, and the latter used again in a repetition of the process.

Other metal fluorides, such as $AgF_2$, $BiF_5$, $CeF_4$, and $MnF_3$, may be substituted for $CoF_3$, in the above process, but practically, so far as I have tested them, $CoF_3$ is the most satisfactory. $MnF_3$, for instance, gives a fusible mixture with the $UF_4$ which is difficult to handle, does not give complete conversion, and is difficult to reform for admixture with more $UF_4$ for a repetition of the process.

The utilization of the hydrogen in the reduction of the higher uranium oxide to $UO_2$, the utilization of the HF in the convertion of $UO_2$ to $UF_4$, and the utilization of the cobaltic fluoride in the conversion of $UF_4$ to $UF_6$ are highly efficient. It will be noted that the handling of the materials and the apparatus are very simple and inexpensive, and the process is therefore highly economical and relatively free of danger, considering the nature of the reagents and conditions involved.

This application is a continuation in part of my copending application, Ser. No. 475,851, filed February 13, 1943.

As many embodiments may be made of this inventive concept and as many modifications may be made in the embodiments hereinbefore set forth, it is to be understood that all matter described herein is to be interpreted merely as illustrative and limited only by the scope of the appended claims.

I claim:

1. Process for the production of uranium hexafluoride which comprises heating uranium tetrafluoride with cobaltic fluoride in the absence of air, and recovering the uranium hexafluoride thereby produced.

2. Process for the production of uranium hexafluoride which comprises heating uranium tetrafluoride with cobaltic fluoride at an elevated temperature of 300° to 400° C. in the absence of air, and recovering the uranium hexafluoride thereby produced.

3. Process for the production of uranium hexafluoride which comprises reacting uranium dioxide with anhydrous hydrogen fluoride and heating the resulting uranium tetrafluoride with cobaltic fluoride in the same reaction zone in the absence of air, and recovering the uranium hexafluoride thereby produced.

4. Process for the production of uranium hexafluoride from a higher oxide of uranium than the dioxide which is performed in a single reaction zone without removal of the intermediate uranium reaction products therefrom which comprises reducing the higher oxide with hydrogen at an elevated temperature, reacting the resulting uranium dioxide with anhydrous hydrogen fluoride, and heating the resulting uranium tetrafluoride with cobaltic fluoride in the absence of air, and recovering the uranium hexafluoride thereby produced.

5. Process for the production of uranium hexafluoride which comprises heating uranium tetrafluoride with a fluorinating agent selected from the group consisting of silver difluoride ($AgF_2$), bismuth pentafluoride ($BiF_5$), ceric fluoride ($CeF_4$), cobaltic fluoride ($CoF_3$), and manganese trifluoride ($MnF_3$) in the absence of air, and recovering the uranium hexafluoride thereby produced.

6. A process of producing uranium hexafluoride from an oxide of uranium higher than the dioxide which is performed in a single reaction zone without removal of the intermediate uranium reaction products therefrom which comprises contacting said higher oxide with hydrogen at an elevated temperature, contacting the resulting uranium dioxide with hydrogen fluoride to form uranium tetrafluoride, and heating the resulting uranium tetrafluoride in intimate mixture with a fluorinating agent selected from the group consisting of silver difluoride, bismuth pentafluoride, ceric fluoride, cobaltic fluoride, and manganese trifluoride in the absence of air, and recovering the uranium hexafluoride thereby produced.

7. A process for producing uranium hexafluoride from a higher oxide of uranium selected from the group consisting of uranium trioxide and uranium tritaoctoxide which is performed in a single reaction zone without removal of the intermediate uranium reaction products therefrom which comprises passing gaseous hydrogen over a thin layer of said higher oxide of uranium at a temperature of 500° to 650° C. to convert said higher oxide to uranium dioxide, passing anhydrous hydrogen fluoride over the thin layer of uranium dioxide at a temperature of 400° to 600° C. to convert said uranium dioxide to anhydrous uranium tetrafluoride, driving excess hydrogen fluoride and water out of the apparatus with a stream of an inert gas, mixing the requisite quantity of cobaltic fluoride with the uranium tetrafluoride, clearing the reaction zone of air, heating said mixture of cobaltic fluoride and uranium tetrafluoride at 300° to 400° C., and collecting the uranium hexafluoride which distills from the apparatus in a trap cooled to a sufficiently low temperature to condense the distilled uranium hexafluoride.

8. A process in accordance with claim 7 in which the residue of cobaltous fluoride which remains in the apparatus is treated with elemental fluorine to reconvert it to cobaltic fluoride.

References Cited in the file of this patent

Mellor: Inorganic and Theoretical Chemistry, vol. 12, pages 74, 75, 139 and 140 (1932). Pub. by Longmans, Green & Co., London.